UNITED STATES PATENT OFFICE.

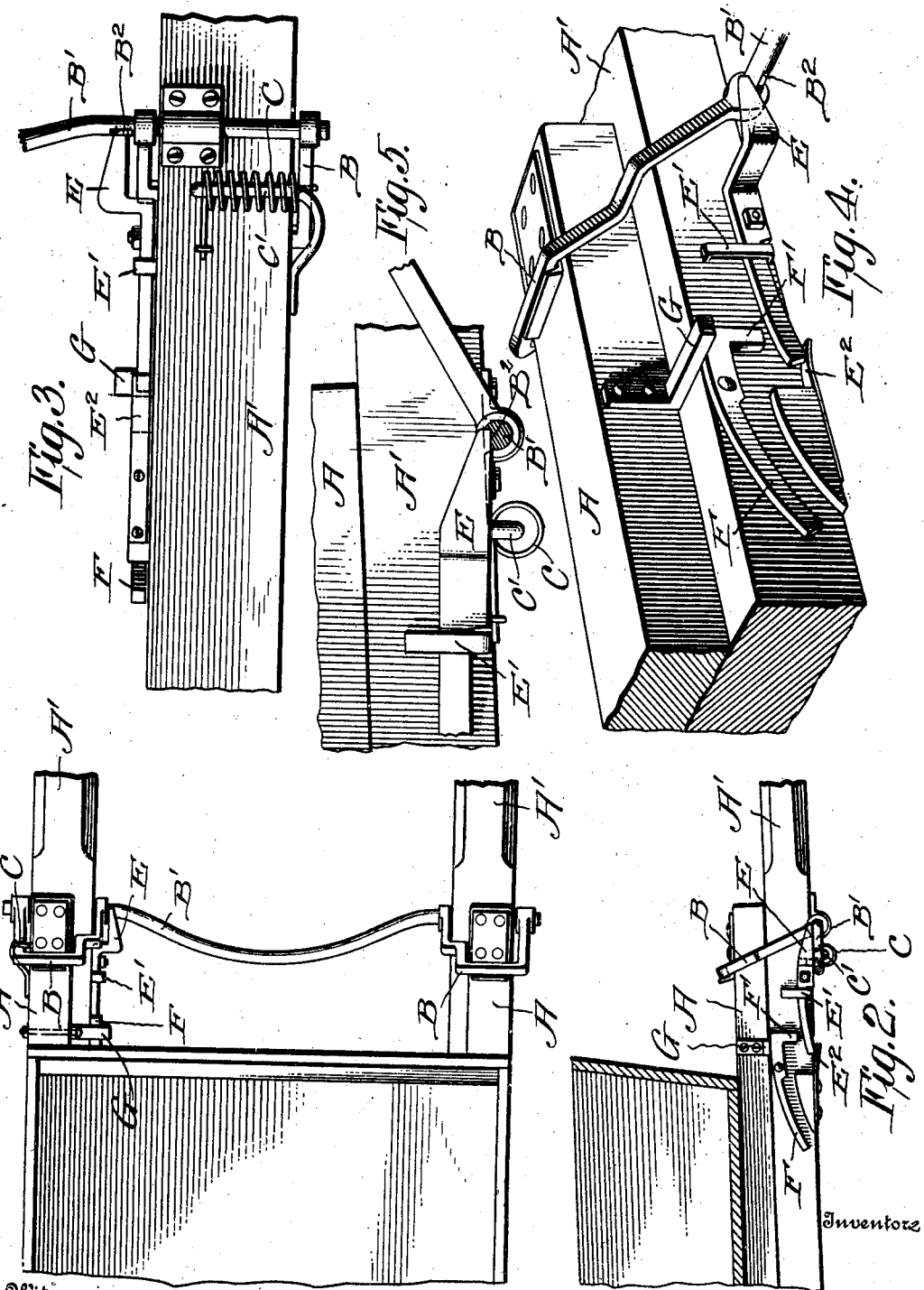

HARRY L. DICKINSON AND ALONZO L. WINDER, OF BLOXOM, VIRGINIA; SAID WINDER ASSIGNOR TO SAID DICKINSON.

LOCK FOR DUMP-CARTS.

No. 896,694.  Specification of Letters Patent.  Patented Aug. 18, 1908.

Application filed October 12, 1907. Serial No. 397,108.

*To all whom it may concern:*

Be it known that we, HARRY L. DICKINSON and ALONZO L. WINDER, citizens of the United States, residing at Bloxom, in the county of Accomac and the State of Virginia, have invented a new and useful Lock for Dump-Carts, of which the following is a specification.

This invention relates to a fastening device for dump carts and is intended to lock the body of the cart against accidental dumping, and to perform the locking action automatically upon the fall of the cart body upon the shafts, thus preventing any accidents through failure of the driver to lock the cart and requiring no action upon his part other than the ordinary one of tipping the cart body back into its normal position.

The invention consists in the novel features of construction hereinafter described and pointed out in the claims and shown in the accompanying drawings, in which:

Figure 1 is a plan view of our device showing portions of the cart sills and shafts. Fig. 2 is a vertical, longitudinal, sectional view showing the locking device as applied to the left-hand side of the cart. Fig. 3 is an enlarged, inverted plan view of one side portion only. Fig. 4 is a detailed perspective view of the locking mechanism. Fig. 5 is a cross-sectional view taken through a lock-shaft.

In these drawings A represents the sill of the cart and A' the shafts. U-shaped clips B, are carried by a locking-shaft B'. This shaft is journaled under the cart shafts and is slightly curved between the shafts. It is provided also with a groove $B^2$. A coil spring C has one end secured to the under side of one of the shafts A' and its free end engages the adjacent clip B. The body portion of the spring is wound about a bent rod C'. The tendency of this spring is to hold the clips in the position shown in the drawings. It will be understood that the clips are fixed tightly upon the locking-shaft which partially rotates when either clip is thrown back out of engagement with the cart sill, so that the movement of one clip results in a similar movement of the other. To lock the clips out of engagement with the sill we employ a pivoted pawl E which works in a bracket E' and is carried by the inner side of the left-hand shaft. This pawl is held in engagement with the locking-shaft B' by a spring $E^2$, and upon rotation of the shaft the pawl drops into the groove $B^2$ and prevents reverse rotation of the shaft. To automatically release the pawl, upon the fall of the cart body, a hammer F is pivoted upon the shaft of the cart and is provided with a head F' which overhangs the rear end of the pawl E. The opposite end of the hammer being heavier than the head end; the head is held out of engagement with the pawl by gravity. Upon the cart sill A, on the left-hand side, is placed an angle arm G and as the cart body drops back into place this arm strikes the hammer head and throws it downwardly with such force that it strikes and trips the pawl E, thus releasing the shaft B', and the clips B under pull of the spring C, fly back into locking position.

What we claim is:

1. The combination with a cart, of a rotatable shaft carried by the cart-shaft and provided with clips for engagement with the cart-sills, said rotatable shaft being grooved, a pawl engaging said groove, a spring for holding the clips normally in engagement with the cart sills, and means for disengaging said pawl on fall of the cart body.

2. In a device of the kind described, clips carried by a cart-shaft and engaging the sills, a rotatable shaft connecting said clips, a pawl engaging the shaft, a hammer, and an arm carried by the cart sill in position to strike the hammer and throw same against the pawl.

HARRY L. DICKINSON.
ALONZO L. WINDER.

Witnesses:
HOWARD J. LITTLETON,
JOSEPH R. RIGGS.